United States Patent [19]

Godbout

[11] 4,131,107
[45] Dec. 26, 1978

[54] DEVICE FOR MELTING ICE AT A FISH HOLE IN THE ICE

[76] Inventor: Emil E. Godbout, 200 Douglas Rd., Carlton, Minn. 55718

[21] Appl. No.: 877,000

[22] Filed: Feb. 13, 1978

Related U.S. Application Data

[63] Continuation of Ser. No. 715,985, Aug. 19, 1976, abandoned.

[51] Int. Cl.$^2$ .............................................. F23C 3/00
[52] U.S. Cl. ............................ 126/271.2 R; 126/9 R
[58] Field of Search ................... 126/271.1, 271.2 R, 126/271.3, 9 R, 92 B

[56] References Cited

U.S. PATENT DOCUMENTS

| | | | |
|---|---|---|---|
| 2,483,787 | 10/1949 | Sheraski | 126/271.3 X |
| 2,618,091 | 11/1952 | Sheraski | 126/271.3 X |
| 3,025,852 | 3/1962 | Quilling | 126/271.2 R |
| 3,030,122 | 4/1962 | Madera | 126/271.3 X |
| 3,170,458 | 2/1965 | Ahderlie | 126/271.3 |
| 3,171,404 | 3/1965 | Skog | 126/271.3 |
| 3,698,376 | 10/1972 | Webb | 126/9 R |

FOREIGN PATENT DOCUMENTS 419580  11/1934  United Kingdom ................. 126/271.2

Primary Examiner—William F. O'Dea
Assistant Examiner—Harold Joyce
Attorney, Agent, or Firm—Wicks & Nemer

[57] ABSTRACT

The device for melting ice at a fish hole in the includes an enclosure having first and second sidewalls hingedly connected to first and second end walls together with a cover formed in two portions, each cover portion hingedly connected to a sidewall. A partial bottom is hingedly connected to an end wall. One of the cover portions is formed with an opening through which a fish line extends into the enclosure with the cover portions closed. One of said cover portions has a baffle connected thereto which extends into the enclosure with a heat shield mounted on the underside of the cover. A cover portion carries a window for visual inspection of an ice hole over which the device is placed. The partial bottom is adapted to mount a source of heat beneath the heat shield and between the baffle and an end wall.

4 Claims, 6 Drawing Figures

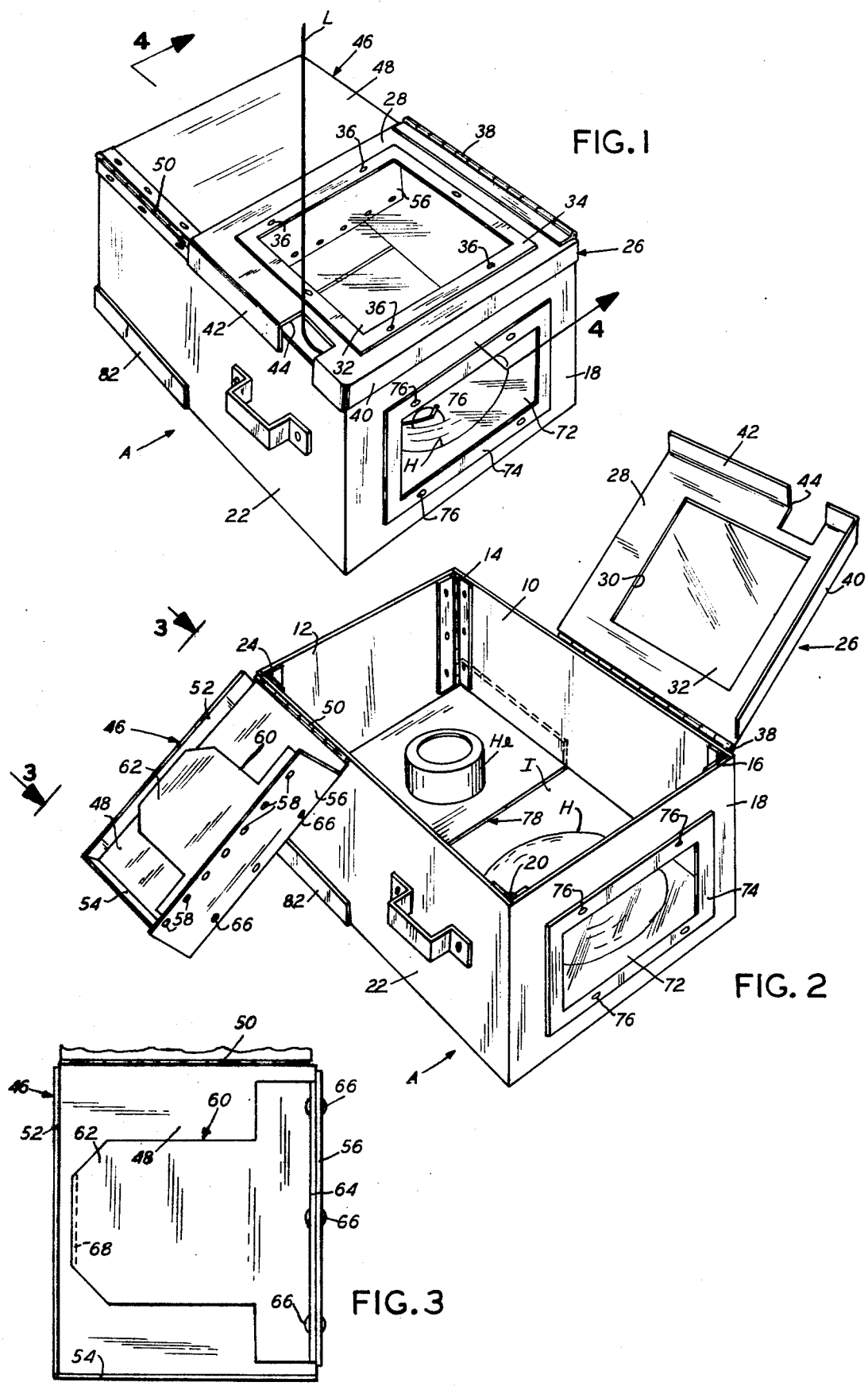

DEVICE FOR MELTING ICE AT A FISH HOLE IN THE ICE

CROSS REFERENCE

This is a continuation of application Ser. No. 715,985 filed Aug. 19, 1976, abandoned.

SUMMARY

The invention relates to a device for preventing the formation of ice at a hole in the ice covering a lake and more particularly to a device including an enclosure having sidewalls and end walls with a partial bottom for supporting a heating element together with a first partial cover overlying the partial bottom for easy access to the heating element, the first partial cover carries a baffle which directs heat downwardly from the partial top where it spreads laterally to an open bottom portion positioned at a hole in the ice to prevent ice from forming at the ice hole. A second partial cover in alignment with the first partial cover covers the open bottom portion and is formed with a recess portion through which a fish line is extended for operation in the hole in the ice. The sidewalls and end walls are hingedly connected together and the partial bottom is hinged to an end wall together with the partial covers hinged to the sidewalls whereby the entire device may be folded into a relatively flat state for carrying and storing.

In the drawings forming part of this application:

FIG. 1 is a perspective view of a device for melting ice at a fish hole in closed operative condition and embodying the invention.

FIG. 2 is a perspective view similar to FIG. 1 but with both covers in open position.

FIG. 3 is a view on the line 3—3 of FIG. 2.

Figure 4:
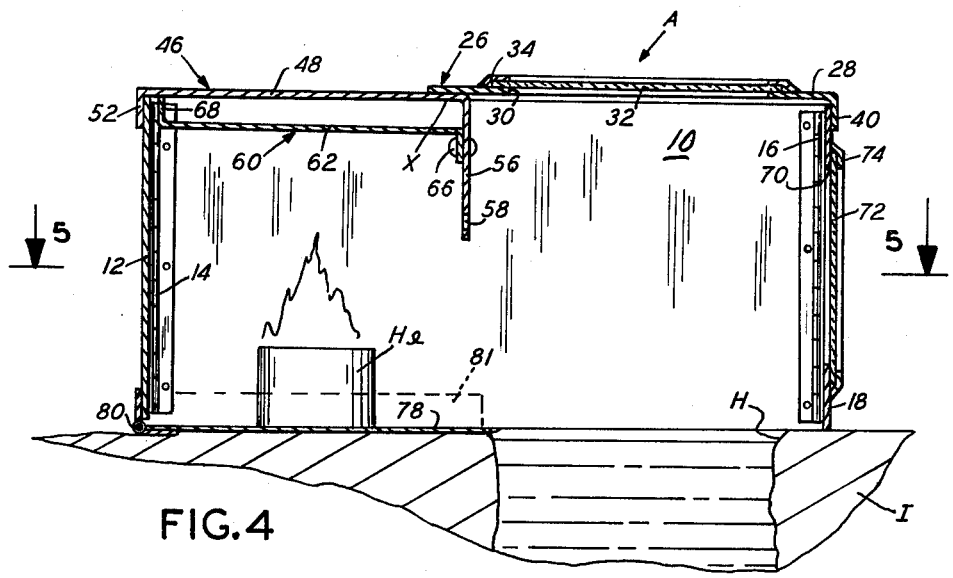
FIG. 4 is a sectional view on the line 4—4 of FIG. 1.
Figure 5:
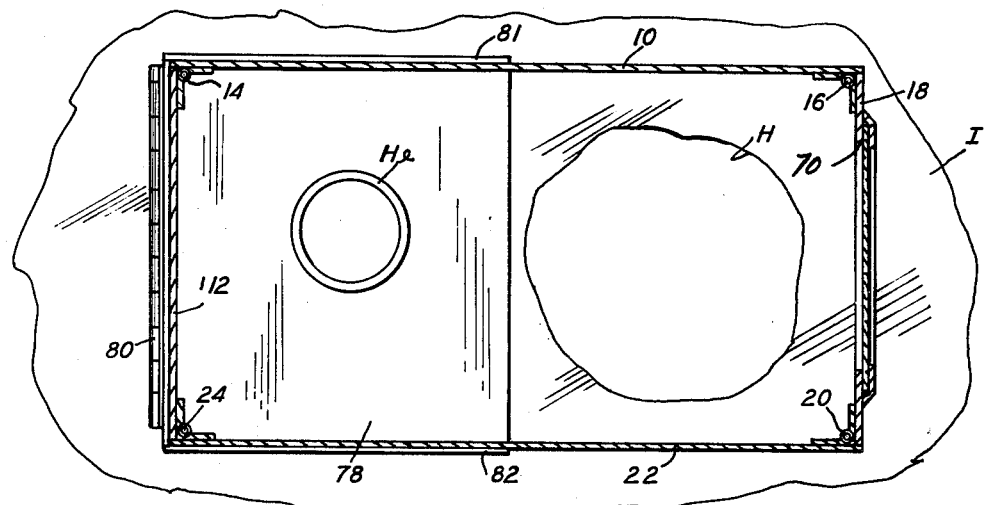
FIG. 5 is a sectional view on the line 5—5 of FIG. 4.

Referring to the drawings in detail, the device for melting ice at a fish hole A is in the form of a box-like enclosure and it includes the first sidewall 10 hingedly connected at one end to the first end wall 12 by means of the hinge 14. The sidewall 10 is hingedly connected at the other end by the hinge 16. Further provided is the second end wall 18 connected at one end to the hinge 16 and at the other end to the hinge 20 with the hinge 20 connected to one end of the second sidewall 22. The other end of the second sidewall 22 is connected to the hinge 24 which is connected to the other end of the first end wall 12.

The numeral 26 designates a first partial cover including the flat portion 28 formed with the opening 30 over which is secured the inspection glass 32 by means of the frame 34 secured by the metal screws 36. The partial cover 26 is hingedly connected at one edge to the upper edge of the first sidewall 10 by means of the hinge 38. The cover 26 also includes the first depending flange 40 which aligns alongside the second end wall 18 when the cover is closed upon the sidewalls 10 and 22. Formed on an edge of the partial cover 26 is the second depending flange 42 adapted to align alongside the second sidewall 22 when the cover is closed upon the sidewalls, FIG. 1 in particular. The partial cover 26 allows easy access to the hole H in the ice. The flat portion 28 of the cover 26 is formed with the access opening 44.

Further provided is the second partial cover 46 which includes the flat portion 48 hingedly connected at one edge to the sidewall 22 by means of the hinge 50. The cover 46 allows easy access to heating means hereinafter referred to. Formed on the cover portion 48 is the flange 52 which aligns alongside the end wall 12 when the cover 46 is closed and the flange 54 which aligns alongside the sidewall 10, when the cover 46 is closed. The inner edge of cover 46 is formed with the flange 56 which extends partially into the device when the cover is closed and acts as a heat baffle as will be seen. The flange 56 is formed with the series of holes 58 to allow heat transfer as will be seen.

The numeral 60 designates a heat shield formed of the flat plate portion 62 on one edge of which is formed the flange 64 secured to the flange 56 by means of the rivets 66. The outer face edge of the shield 60 is formed with the flange 68 the edge of which is adjacent the underside of the cover 48. The shield is so positioned on the flange 56 that it is spaced from the underside of the plate portion 48. The extent of the partial cover 46 and partial cover 26 is such that the cover 26 overlaps a portion of cover 46 as at "X," FIG. 4 in particular, to thereby seal off the entire enclosure.

The end wall 18 is formed with the inspection opening 70 covered by the glass 72 and held in place by the frame 74 secured to the wall 18 by means of the screws 76. The numeral 78 designates a partial bottom which extends from sidewall 10 to sidewall 22 and is hingedly connected to end wall 12 by means of hinge 80. Secured to the opposed side edges of the bottom 78 are the upstanding flanges 81 and 82 which align alongside the sidewalls 10 and 22, respectively, when the hinged bottom is in operative contact with the lower edges of the sidewalls 10 and 22.

It will be seen that from the inner edge of the partial bottom 78 to the end wall 18 the enclosure is open.

In use, the device A is positioned with the open portion of the bottom over the hole H in the ice I. The cover portions 26 and 46 are both opened as in FIG. 2. A source of heat such as a "Sterno" T.M. canned heat He is placed on the bottom member 78 and ignited and the cover 46 closed upon the sidewalls. Bait on a fish line L is then placed in the hole H. The cover 26 is then closed with the line L extended outwardly through the access opening 44. Heat created from the source He is shielded from the top cover 46 by means of the shield 60 when the cover is placed in closed position. Further, heat emanating from the source He is directed downwardly from the top 48 by means of the baffle 56 and the heat then spreads laterally into the area of the device surrounding the ice hole H where it keeps the water in the hole H and the possibility of fish on the line L can be easily viewed through either the glass 32 or the glass 72.

Figure 6:
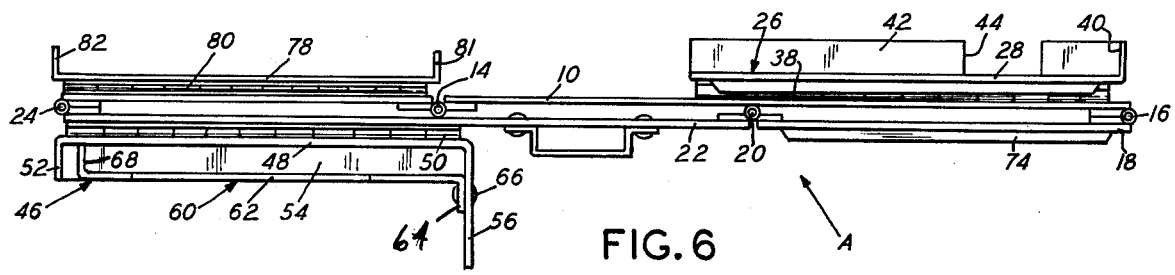
FIG. 6 is a longitudinal side view of the device in folded condition.

When a fish is indicated on the line L the cover 26 is opened and the line and fish removed from the device. When the device is not in use the same may be folded into a somewhat flat compact posture as illustrated in FIG. 6 for easy carrying and storage.

Having thus described the invention, what is claimed as new and desired to be secured by Letters Patent is:

1. A device for melting ice at a fish hole comprising:
    (a) an enclosure having first and second sidewalls connected to
    (b) first and second end walls,
    (c) a cover for the enclosure including a first partial cover hingedly connected at one edge to a portion of said first sidewall,
    (d) a second partial cover hingedly connected at one edge to a portion of said second sidewall with an edge thereof abutting an edge of said first partial cover, (e) said second partial cover having a baffle plate connected thereto at a right angle along one edge thereof and extended into the enclosure when the cover is closed upon the enclosure, (f) said second partial cover having a heat shield carried by said cover and spaced therefrom, (g) means hingedly connecting said end walls at each edge to each end of said side walls, (h) said first partial cover having an opening adjacent to and extending through the edge thereof and adapted to receive a fish line for extension therethrough to a hole in ice on which the device is positioned, (i) a partial bottom hingedly connected at one edge to said first end wall and beneath and substantially in alignment with said second partial cover adapted to receive heating means upon the inner surface thereof, (j) said first partial cover having an opening formed therein for viewing an ice hole in line therewith and adjacent said partial bottom.

2. The device of claim 1 in which said baffle has a multiplicity of holes formed therethrough to allow transfer of heat from said heat shield into the area of the enclosure beneath said first partial cover.

3. The device of claim 2 in which said second partial cover includes flanges formed on edges thereof for positioning alongside said first end wall and said first sidewall.

4. The device of claim 3 in which said partial bottom has a flange formed on each side edge thereof for positioning alongside said first and second sidewalls when said partial bottom is moved into contact with said first and second sidewalls.

* * * * *